United States Patent
Cave et al.

(10) Patent No.: US 7,292,874 B2
(45) Date of Patent: Nov. 6, 2007

(54) METHOD, ACCESS POINT AND WTRU FOR CONTROLLING TRANSMISSION POWER LEVELS OF UPLINK/DOWNLINK COMMUNICATION IN A WIRELESS COMMUNICATION SYSTEM

(75) Inventors: Christopher Cave, Candiac (CA); Paul Marinier, Brossard (CA); Noam Tomczak, Ottawa (CA)

(73) Assignee: InterDigital Technology Corporation, Wilmington, DE (US)

( * ) Notice: Subject to any disclaimer, the term of this patent is extended or adjusted under 35 U.S.C. 154(b) by 177 days.

(21) Appl. No.: 10/991,267

(22) Filed: Nov. 17, 2004

(65) Prior Publication Data
US 2005/0143120 A1 Jun. 30, 2005

Related U.S. Application Data

(60) Provisional application No. 60/520,740, filed on Nov. 17, 2003.

(51) Int. Cl.
*H04B 7/00* (2006.01)

(52) U.S. Cl. .......................................... 455/522; 455/69

(58) Field of Classification Search ................. 455/69, 455/522; 370/318, 320
See application file for complete search history.

(56) References Cited

U.S. PATENT DOCUMENTS

2003/0148769 A1* 8/2003 Chi et al. ................... 455/453
2004/0202243 A1* 10/2004 Lin et al. .................... 375/227

OTHER PUBLICATIONS

Holma et al. eds.; *WCDMA for UTMS*, John Wiley & Sons; Mar. 2001; "Radio Resource Management"; Chapter 9; pp. 183-215.

* cited by examiner

*Primary Examiner*—Edward F. Urban
*Assistant Examiner*—Raymond S. Dean
(74) *Attorney, Agent, or Firm*—Volpe and Koenig, P.C.

(57) ABSTRACT

Transmission power levels of uplink/downlink communication is controlled in a wireless communication system. A receiving station produces and provides to a transmitting station power control information based upon received signals from the transmitting station. A measured block error rate ($BLER_{msr}$) is obtained from the number of erroneous blocks in a sliding window of the last N received data blocks and SIR adjustments are set based upon the $BLER_{msr}$ and a target BLER ($BLER_{target}$). A target SIR of received signals is adjusted according to the SIR adjustments.

21 Claims, 1 Drawing Sheet

Figure 1:
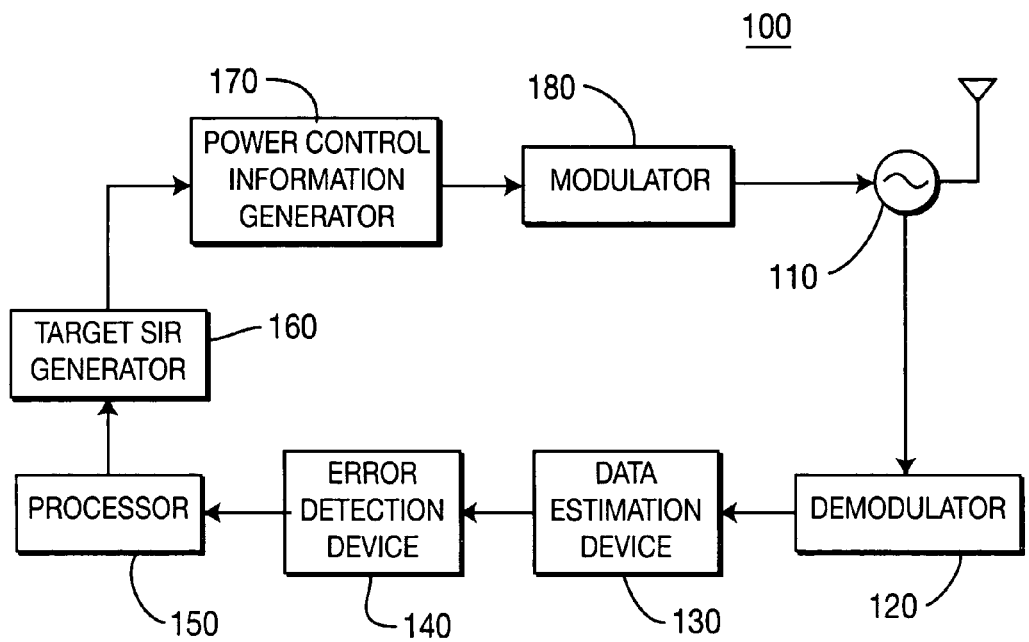

METHOD, ACCESS POINT AND WTRU FOR CONTROLLING TRANSMISSION POWER LEVELS OF UPLINK/DOWNLINK COMMUNICATION IN A WIRELESS COMMUNICATION SYSTEM

CROSS REFERENCE TO RELATED APPLICATION

This application claims priority from U.S. Provisional Application No. 60/520,740 filed on Nov. 17, 2003, which is incorporated by reference as if fully set forth.

FIELD OF INVENTION

The present invention relates to a wireless communication system employing outer loop power control. More particularly, the invention relates to an enhanced outer loop power control system with a modified jump algorithm.

BACKGROUND

It is essential to reduce unnecessary interference in a wireless communication system where users share a common frequency for transmission or reception of data. Effective power control reduces interference to a reasonable level while maintaining satisfactory signal quality for a given radio link connection.

Power control typically consists of two stages: Outer Loop Power Control (OLPC); and Inner Loop Power Control (ILPC). The OLPC controls a target signal to interference ratio (SIR) to keep the received quality as close as possible to a target quality. The ILPC controls transmission power to keep the received SIR of each dedicated channel (DPCH) as close as possible to a target SIR. In other words, the output of the OLPC is an updated target SIR used for the ILPC.

A typical OLPC measures Block Error Rate (BLER) as an indication of the quality of the received signal. The BLER is the ratio of number of erroneous transport blocks to the total number of transmitted transport blocks. Quality targets for transmitted data are determined based on the BLER, for example a target BLER of 1%. The OLPC sets a target SIR according to the required quality for a given service, such as BLER. A Cyclic Redundancy Check (CRC) is used to determine whether there are errors in a particular transmission. Basically, user data is segmented in transport blocks for transmission and CRC bits are appended to each transport block. This data scheme is used at the receiver to determine if an error occurred.

A known OLPC process, the jump algorithm, controls power by adjusting a target SIR based on the BLER. However, the jump algorithm is still problematic in that calls having high quality requirements experience a BLER significantly above a desired BLER. Moreover, this problem occurs more frequently when short calls transmit their smaller number of transport blocks.

It would be desirable to improve OLPC with a jump algorithm that significantly reduces the frequency of calls experiencing a higher error rate.

SUMMARY

Transmission power levels of uplink/downlink communications are controlled in a wireless communication system in accordance with the present invention. A receiving station produces and provides to a transmitting station power control information based upon received signals from the transmitting station. As data blocks are received, a measured block error rate ($BLER_{msr}$) is obtained from the number of erroneous blocks in the last N received data blocks, and a target SIR is adjusted based upon the $BLER_{msr}$ and a target BLER ($BLER_{target}$). This permits the present invention to better adapt the target SIR to increase the probability that a call meets its specified BLER requirement.

BRIEF DESCRIPTION OF THE DRAWING(S)

Figure 2:
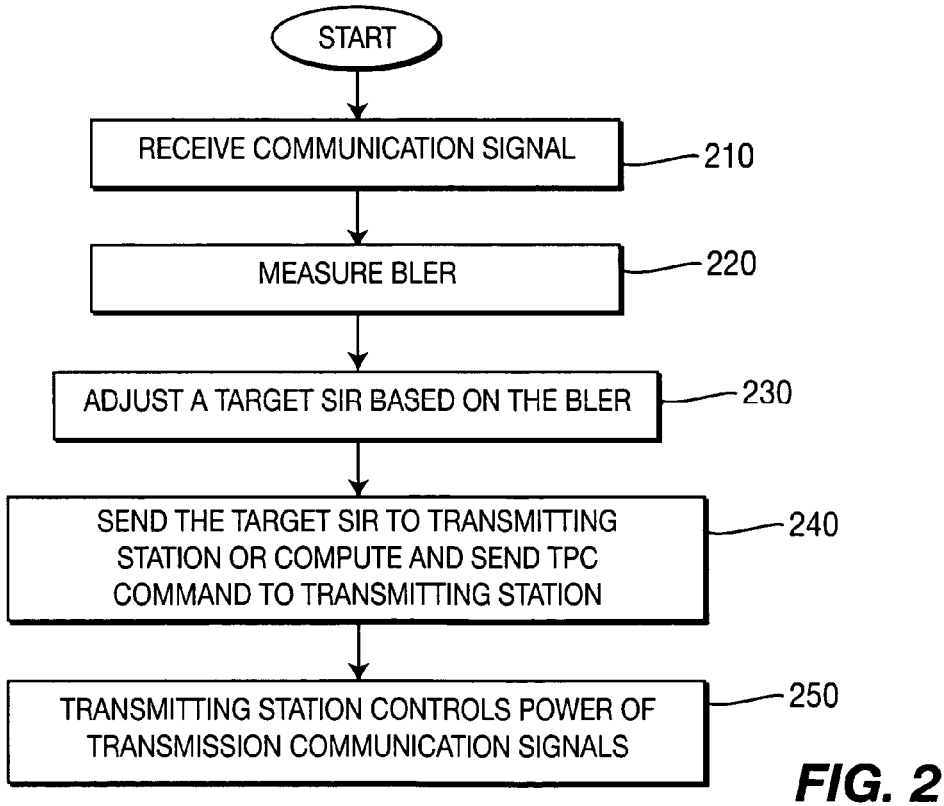

A more detailed understanding of the invention may be had from the following description, given by way of example and to be understood in conjunction with the accompanying drawings wherein:

FIG. 1 is a block diagram of a communication station configured to perform OLPC in accordance with the present invention; and FIG. 2 is a flow diagram of a method for performing OLPC in accordance with the present invention.

DETAILED DESCRIPTION OF THE PREFERRED EMBODIMENT(S)

Hereafter, the term "station" includes but is not limited to a user equipment, a wireless transmit/receive unit (WTRU), an access point (AP), mobile station, a base station, fixed or mobile subscriber unit, receiving station, transmitting station, communication station, pager, or any other type of device capable of operating in a wireless environment. Furthermore, each of these terms may be used interchangeably herein.

Referring to FIG. 1, a communication station 100 configured to perform OLPC in accordance with the present invention is shown. It is noted that the present invention may be implemented in the uplink and/or downlink. The communication station 100 receives various radio frequency signals including communications from a transmitting station (not shown in FIG. 1). A received signal is passed through an isolator 110 to a demodulator 120. The demodulator 120 produces a baseband signal from the received signal.

A data estimation device 130 recovers data from the baseband signal. An error detection device 140 detects errors in the recovered data. A processor 150 analyzes the detected errors and determines an error rate, such as the BLER of the received communication. The error rate is input to a target SIR generator 160 which generates the target SIR based on the error rate provided by the processor 150. The target SIR is then input to a power control information generator 170. The power control information generator 170 generates appropriate power control information depending, in part, on what type of ILPC is utilized by the system in which the communication station 100 is operating. For example, UMTS TDD uses open loop ILPC in the downlink whereas other types of wireless systems use closed loop ILPC.

Where closed loop ILPC is used, the power control information generator 170 compares a measured SIR of received frames/blocks versus the SIR target generated by the target SIR generator 160 and generates a target power control (TPC) command. The TPC command provides an indication of whether a transmitter communicating with the communication station 100 should increase or decrease its power. For example, where the measured SIR is less than the target SIR, the TPC command indicates that the transmitter should increase its power and where the measured SIR is greater than the target SIR, the TPC command indicates that the transmitter should decrease its power.

Where open loop ILPC is used, the power control information generator 170 simply outputs the target SIR provided from the target SIR generator 160. In this case, the transmitter communicating with the communication station 100 is responsible for determining how it should modify its power setting to achieve the target SIR.

The power control information (i.e. the SIR target or TPC command) generated by the power control information generator 170 is input to a modulator 180. The modulator 180 modulates the information for transmission to the transmitting station (not shown).

Referring to FIG. 2, an OLPC process 200 in accordance with the present invention is shown. Once the receiving station 100 receives a communication signal (step 210), the received communication signal is processed and the BLER of the sequence of data blocks is measured (step 220).

The measured BLER ($BLER_{msr}$) is based upon the last N received blocks, and is a ratio of the number of received blocks having an error ($N_e$) to the total number of received blocks (N), (that is, $N_e/N$). N is the width of a sliding window during which the BLER is measured. For example, N may be determined as follows to keep track of recent data blocks:

$$N = K/BLER_{target};\qquad\text{Equation (1)}$$

where K is a constant, for example larger than or equal to 1, and $BLER_{target}$ is a target BLER value. Since the present invention uses the error rate of the most recent N data blocks, the target SIR increases the probability that a call meets its BLER requirement.

After the BLER for a received communication signal is measured, a target SIR ($SIR_{target}$) is adjusted based on the BLER values, (i.e., $BLER_{msr}$ and $BLER_{target}$) (step 230). The target SIR adjustments are based on the error check of received data blocks, such as CRC or Forward Error Correction (FEC). It should be understood by those of the skill in the art that other error checking schemes may be employed without departing from the spirit and scope of the present invention.

If the error checking result of a data block is acceptable, the target SIR ($SIR_{target}$) is preferably determined by Equations 2-4:

$$SIR_{target} = SIR_{target}^{*} - STEP_{down}\qquad\text{Equation (2)}$$

$$STEP_{down} = (1 + BLER_{down}) \times BLER_{target} \times STEP_{size}\qquad\text{Equation (3)}$$

$$BLER_{down} = \max(-1, 1BLER_{msr}/BLER_{target})\qquad\text{Equation (4)}$$

where $SIR_{target}^{*}$ is a previous target SIR, and $STEP_{size}$ is a parameter that determines convergence speed of the jump algorithm.

If the error checking result of a data block is unacceptable, the target SIR ($SIR_{target}$) is determined by Equations 5-7:

$$SIR_{target} = SIR_{target}^{*} + STEP_{up}\qquad\text{Equation (5)}$$

$$STEP_{up} = (1 + BLER_{up}) \times (1 - BLER_{target}) \times STEP_{size}\qquad\text{Equation (6)}$$

$$BLER_{up} = \min(2, BLER_{msr}/BLER_{target} - 1)\qquad\text{Equation (7)}$$

where $SIR_{target}^{*}$ is a previous target SIR, and $STEP_{size}$ is a parameter that determines convergence speed of the jump algorithm.

The step size of SIR target adjustment ($STEP_{size}$) is dependent upon the difference between the measured BLER ($BLER_{msr}$) and the target BLER ($BLER_{target}$). By way of example, assume the $BLER_{target}$ is set to 1%, and the CRC status of the 100 last blocks is kept in memory to calculate the measured BLER (i.e. N=100). Using a basic $STEP_{size}$ of 1.0 dB, the step actual step size up (in case of a CRC error), $STEP_{up}$, could take any of the following values:

1. 0.99 dB, if the first error has occurred within the past 100 blocks or;
2. 1.98 dB if the second error has occurred within the past 100 blocks or;
3. 2.97 dB if the third (or greater) error has occurred within the past 100 blocks.

As a result, the SIR target will increase more aggressively when multiple errors have occurred, ensuring a quicker recovery time.

Similarly, the step size down (in case of a CRC success), $STEP_{down}$, could take any of the following values:

1. 0.02 dB, if no errors have occurred in the last 100 blocks.
2. 0.01 dB, if one error has occurred in the last 100 blocks.
3. 0 dB, if more than one error has occurred in the last 100 blocks.

In accordance with Equations 2-7, for high $BLER_{msr}$, the $BLER_{up}$ increases and, in turn, $STEP_{up}$ becomes larger than for lower $BLER_{msr}$. As a result, the increase of $SIR_{target}$ is larger as $BLER_{msr}$ increases. On the other hand, when $BLER_{down}$ decreases, $STEP_{down}$ in turn becomes smaller for high $BLER_{msr}$ than for low $BLER_{msr}$. As a result, $SIR_{target}$ changes less from the previous value $SIR_{target}^{*}$, as $BLER_{msr}$ increases.

The $STEP_{up}$ is increased when multiple $SIR_{target}$ increases have taken place in recent history, and $STEP_{down}$ is increased when no $SIR_{target}$ increase have taken place in recent history. Additionally, since the amount of SIR adjustment for each data block's BLER change is larger, it converges to the target quality of service much more quickly, and the OLPC can respond to short calls which transmit a small number of transport blocks promptly.

In an alternative embodiment, the convergence to the $BLER_{target}$ is improved by altering the formulation of $STEP_{down}$ of the $SIR_{target}$ as follows in Equations 8 and 9:

$$STEP_{down} = (2 \times BLER_{target} - BLER_{msr}) \times STEP_{size}\qquad\text{Equation (8)}$$

$$STEP_{up} = STEP_{size} - STEP_{down}\qquad\text{Equation (9)}$$

With this approach, when the measured BLER exceeds the target BLER, the SIR falls in a critical region where block errors are likely to occur after a longer time. This compensates for the high BLER having occurred in the past. On the other hand, observing a $BLER_{msr}$ lower than $BLER_{target}$ results in an increase of the $STEP_{down}$ and consequently, block errors are likely to occur after a shorter time. This compensates for the low BLER having occurred in the past.

Referring back to FIG. 2, after the new target SIR is determined, depending on whether open loop ILPC or closed loop ILPC is being utilized, the target SIR is sent to a transmitting station or a TPC command is computed and sent to the transmitting station, respectively (step 240). As explained above, the target SIR and TPC command may be collectively referred to as power control information. Then, in step 250, the transmitting station controls power of transmission communication signals based on the power control information provided to the transmitting station.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for controlling transmission power levels of uplink/downlink communication in a wireless communication system where a receiving station produces power control information based upon received signals from the transmitting station, the method comprising:
   (a) receiving data blocks at the receiving station;
   (b) tracking the number of erroneous blocks in the last N received data blocks to get a measured block error rate ($BLER_{msr}$);
   (c) adjusting a target SIR ($SIR_{target}$) based upon the $BLER_{msr}$ and a target BLER ($BLER_{target}$) wherein the step size of the ($SIR_{target}$) adjustment is dependent on historical $SIR_{target}$ adjustments;
   (d) generating power control information; and
   (e) sending the power control information to the transmitting station for use in controlling the transmitting station's transmission power levels.

2. The method of claim 1 wherein N, width of a sliding window, is $K/BLER_{target}$, where K is a constant $\geq 1$.

3. The method of claim 1 wherein the SIR adjustments comprises $STEP_{down}$ and $STEP_{up}$, and the step (c) comprises:
   (c1) setting a new $SIR_{target}$ by subtracting the $STEP_{down}$ from a previous $SIR_{target}$, if CRC check is good in the received data blocks;
   (c2) setting a new $SIR_{target}$ by adding the $STEP_{up}$ to the previous $SIR_{target}$, if CRC check is bad in the received data blocks.

4. The method of claim 3 wherein $STEP_{down}$ is determined by the following equation, $$STEP_{down}=(1+BLER_{down}) \times BLER_{target} \times STEP_{size}$$

where $BLER_{down}=\max(-1, 1-BLER_{msr}/BLER_{target})$ and where the $STEP_{size}$ is a parameter determining a convergence speed of the SIR adjustment.

5. The method of claim 3 wherein $STEP_{up}$ is determined by the following equation, $STEP_{up}=(1+BLER_{up}) \times (1-BLER_{target}) \times STEP_{size}$, where $BLER_{up}=\min(2, BLER_{msr}/BLER_{target}-1)$ and where the $STEP_{size}$ is a parameter determining a convergence speed of the SIR adjustment.

6. The method of claim 3 wherein the $STEP_{down}$ is determined by the following equation, $STEP_{down}=(2 \times BLER_{target}-BLER_{msr}) \times STEP_{size}$, the $STEP_{size}$ is a parameter determining a convergence speed of the SIR adjustment; and the $STEP_{up}$ is determined by subtracting the $STEP_{down}$ from the $STEP_{size}$.

7. The method of claim 1 wherein the power control information is the target SIR ($SIR_{target}$) generated in step(c) of claim 1.

8. The method of claim 1 wherein the power control information is a target power control (TPC) command.

9. The method of claim 8 wherein the TPC command is generated based on comparing the target SIR ($SIR_{target}$) generated in step(c) of claim 1 to a measured SIR.

10. A wireless transmit/receive unit (WTRU) for controlling transmission power levels of communication in a wireless communication system, the WTRU comprising:
    (a) means for receiving data blocks from a transmitting station;
    (b) means for tracking the number of erroneous blocks in the last N received data blocks to get a measured block error rate ($BLER_{msr}$);
    (c) means for adjusting a target SIR($SIR_{target}$) based upon the $BLER_{msr}$ and a target BLER ($BLER_{target}$) wherein the step size of the $SIR_{target}$ adjustment is dependent on historical $SIR_{target}$ adjustments;
    (d) means for generating power control information; and
    (e) means for sending the power control information to the transmitting station used for controlling the transmission power levels.

11. The WTRU of claim 10 wherein N, width of a sliding window, is $K/BLER_{target}$, where K is a constant $\leq 1$.

12. The WTRU of claim 10, wherein the SIR adjustments comprises $STEP_{down}$ and $STEP_{up}$, the WTRU further comprising:
    (e) means for setting a new $SIR_{target}$ by subtracting the $STEP_{down}$ from a previous $SIR_{target}$, if CRC check is good in the received data blocks;
    (f) means for setting a new $SIR_{target}$ by adding the $STEP_{up}$ to the previous $SIR_{target}$, if CRC check is bad in the received data blocks.

13. An access point (AP) for controlling transmission power levels of communication in a wireless communication system where the AP produces power control information for a transmitting station based upon received signals from the transmitting station, the AP comprising:
    (a) means for receiving data blocks at the receiving station;
    (b) an error detection device configured to track the number of erroneous blocks in the last N received data blocks;
    (c) a processor configured to generate an error rate;
    (d) a target SIR generator configured to compute a target SIR ($SIR_{target}$) based upon the difference between the measured error rate and a target error rate wherein the step size of the $SIR_{target}$ adjustment is dependent on historical $SIR_{target}$ adjustments;
    (e) a power control information generator configured to generate power control information; and
    (f) means for sending the power control information to the transmitting station for use in controlling the transmitting station's transmission power levels.

14. The AP of claim 13 wherein the power control information generator generates a transmit power control (TPC) command where a system in which the AP is being implemented utilizes closed loop inner loop power control.

15. The AP of claim 14 wherein the TPC command is generated based on a comparison of a measured SIR versus a target SIR ($SIR_{target}$).

16. A wireless transmit/receive unit (WTRU) for controlling transmission power levels of communication in a wireless communication system where the WTRU produces power control information for a transmitting station based upon received signals from the transmitting station, the WTRU comprising:
    (a) a data estimation device configured to process the received signals into a sequence of data blocks;
    (b) an error detection device configured to detect errors in the last N received the data blocks;
    (c) a processor configured to determine a measured block error rate ($BLER_{msr}$) of the last N data blocks;
    (d) a target SIR ($SIR_{target}$) generator configured to generate a target SIR ($SIR_{target}$) for a transmitting station based on the ($BLER_{msr}$) and a target BLER ($BLER_{target}$) wherein the step size of the $SIR_{target}$ adjustment is dependent on historical $SIR_{target}$ adjustments; and
    (e) a power control information generator configured to generate power control information for use by a transmitting station to control its transmission power level.

17. The WTRU of claim 16 wherein N, width of a sliding window, is $K/BLER_{target}$, where K is a constant $\geq 1$.

18. The WTRU of claim 16 wherein the target SIR ($SIR_{target}$) generation comprises $STEP_{down}$ and $STEP_{up}$, the WTRTU further comprises:
   (f) means for setting a new $SIR_{target}$ by subtracting the $STEP_{down}$ from a previous $SIR_{target}$, if CRC check is good in the received data blocks;
   (g) means for setting a new $SIR_{target}$ by adding the $STEP_{up}$ to the previous $SIR_{target}$, if CRC check is bad in the received data blocks.

19. An access point (AP) for controlling transmission power levels of communication in a Wireless communication system where the WTRU produces power control information for a transmitting station based upon received signals from the transmitting station, the AP comprising
   (a) a data estimation device configured to process the received signals into a sequence of data blocks;
   (b) an error detection device configured to detect errors in last N received data blocks;
   (c) a processor configured to determine a measured block error rate ($BLER_{msr}$) of the last N data blocks;
   (d) a target SIR generator configured to set a target SIR ($SIR_{target}$) for a transmitting station based on the difference between the measured BLER ($BLER_{msr}$) and a target BLER ($BLER_{target}$) wherein the step size of the $SIR_{target}$ adjustment is dependent on historical SIR adjustments; and
   (e) a power control information generator configured to generate power control information for use by a transmitting station to control its transmission power level.

20. The AP of claim 19 wherein N, width of a sliding window, is $K/BLER_{target}$, where K is a constant $\geq 1$.

21. The AP of claim 19, wherein setting the target SIR ($SIR_{target}$) comprises $STEP_{down}$ and $STEP_{up}$, the AP further comprising:
   (d1) means for setting a new $SIR_{target}$ by subtracting the $STEP_{down}$ from a previous $SIR_{target}$, if CRC check is good in the received data blocks;
   (d2) means for setting the new $SIR_{target}$ by adding the $STEP_{up}$ to the previous $SIR_{target}$, if CRC check is bad in the received data blocks.

* * * * *

UNITED STATES PATENT AND TRADEMARK OFFICE
CERTIFICATE OF CORRECTION

PATENT NO. : 7,292,874 B2  
APPLICATION NO. : 10/991267  
DATED : November 6, 2007  
INVENTOR(S) : Cave et al.

Page 1 of 1

It is certified that error appears in the above-identified patent and that said Letters Patent is hereby corrected as shown below:

At column 3, delete Equation (4), and insert therefor
--$BLER_{down} = max(-1, 1 - BLER_{msr}/BLER_{target})$--.

At column 4, line 34, before the word "taken", delete "have" and insert therefor --has--.

At claim 4, column 5, line 39, after the words "where the", delete "$STEP_{size}$is" and insert therefor --$STEP_{size}$ is--.

At claim 11, column 6, line 10, after the word "constant", delete "$\leq 1$" and insert therefor --$\geq 1$--.

At claim 19, column 7, line 13, after the words "in a", delete "Wireless" and insert therefor --wireless--.

Signed and Sealed this

Thirtieth Day of September, 2008

JON W. DUDAS  
*Director of the United States Patent and Trademark Office*